(No Model.) 2 Sheets—Sheet 1.

J. G. KIRKER.
CRUSHING AND GRINDING MILL.

No. 350,064. Patented Sept. 28, 1886.

Witnesses:
Wm. N. Mortimer
Wm. J. Littell

Inventor:
Jabez G. Kirker,
By his Attorney,
J. R. Littell (No Model.) 2 Sheets—Sheet 2.

J. G. KIRKER.
CRUSHING AND GRINDING MILL.

No. 350,064. Patented Sept. 28, 1886.

Witnesses:
W. N. Mortimer
Wm. J. Little

Inventor:
Jabez G. Kirker,
By his Attorney,
J. R. Littell

UNITED STATES PATENT OFFICE.

JABEZ GILES KIRKER, OF LOUISVILLE, KENTUCKY.

CRUSHING AND GRINDING MILL.

SPECIFICATION forming part of Letters Patent No. 350,064, dated September 28, 1886.

Application filed April 12, 1886. Serial No. 198,593. (No model.)

*To all whom it may concern:*

Be it known that I, JABEZ GILES KIRKER, a citizen of the United States, residing at Louisville, in the county of Jefferson and State of Kentucky, have invented certain new and useful Improvements in Crushing and Grinding Mills; and I do hereby declare that the following is a full, clear, and exact description of the invention, which will enable others skilled in the art to which it appertains to make and use the same.

My invention relates to crushing and grinding mills; and it consists in the construction and combinations of parts hereinafter fully described, and pointed out in the claim.

Figure 1:
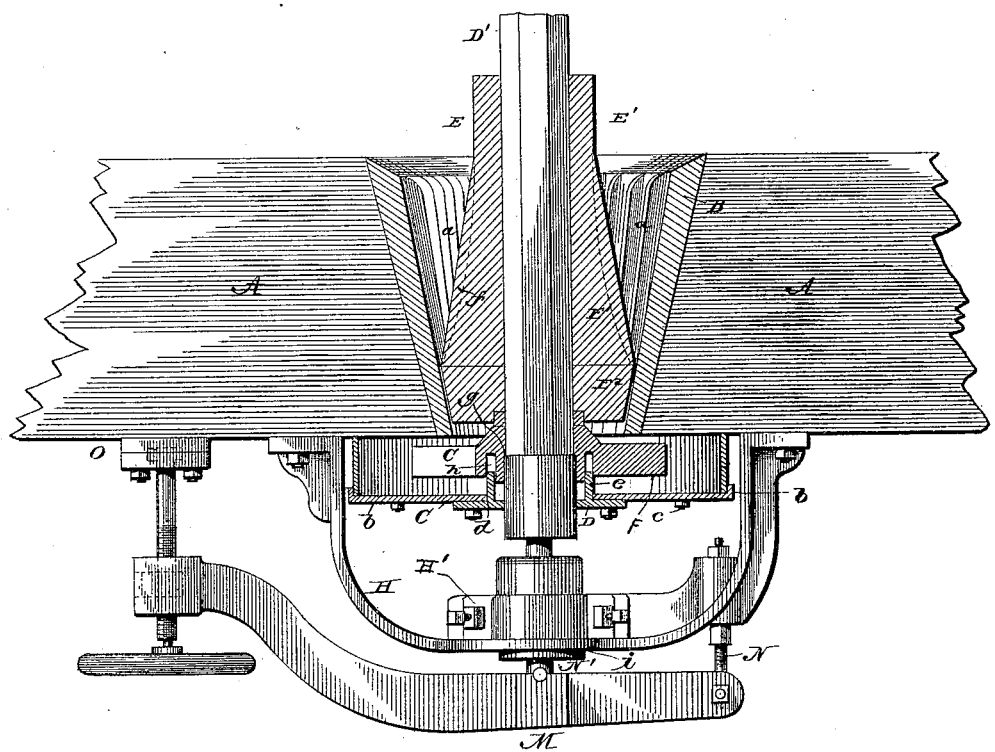
Figure 2:
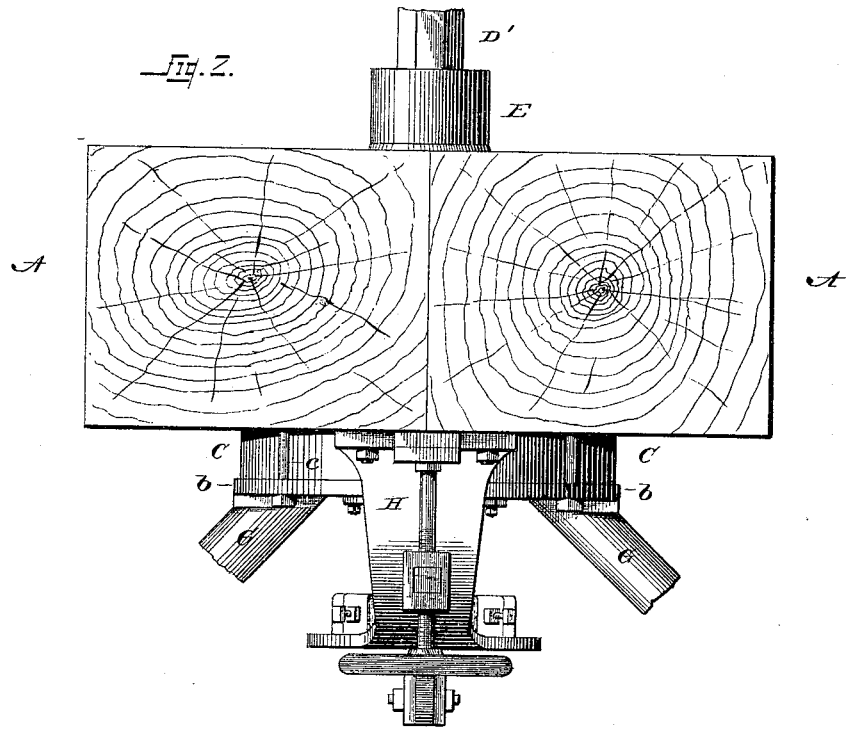
Figure 3:
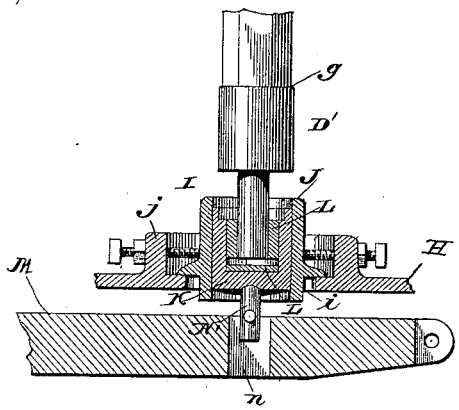

In the drawings, Figure 1 is a side elevation of a grinding or crushing mill with my improvements applied and partly in section. Fig. 2 is an end elevation. Fig. 3 is a detail vertical section.

Corresponding parts in the several figures are denoted by the same letters of reference.

Referring to the drawings, A represents a supporting-beam, in which is seated a shell or receiver, B, which is preferably of cast-iron, and is provided with interior projections or ribs, $a$, which are located closer together, and which occur at more frequent intervals at the lower end of the shell than they do at the upper end thereof. The shell is preferably of the form of an inverted truncated cone, and is open at its upper and lower ends.

C represents a pan or case, which is provided with an annular flange, $b$, at its lower end, through which pass bolts $c$, for securing the pan to the under side of the beam A, said pan or case receiving the crushed material as it drops from the shell. The pan or case C is provided with a central opening, $d$, through which extends a collar or flange, $e$, projecting upwardly from a circular plate, D, bolted to the under side of the pan or case, and having a central opening for the passage of a driving-shaft, D'. The driving-shaft D' is rectangular or hexagonal in shape for a portion of its length, said hexagonal portion being located within the shell B.

Upon the shaft D' is mounted a grinding-cone, E, which consists of two sections, E' E², having vertical passages or openings corresponding in shape to the shaft D', and having a series of vertically-arranged ribs or projections, $f$, adapted to act in conjunction with the ribs or projections on the inner face of the shell. The lower end or section of the crushing-cone tapers downwardly, so as to snugly fit the lower conical end of the shell. It will thus be seen that if the cone is raised in the shell the material being operated upon will be ground coarsely, but that if it is lowered in the shell, so as to be in contact or nearly in contact with the lower end of the shell, the material will be ground very fine. A shoulder, $g$, is formed upon the shaft D' just below the shell, and mounted upon said shaft and supported by the shoulder is a sweep, F, which distributes the crushed material to suitable delivery-spouts, G. The sweep is provided on its under face with a circular groove or recess, $h$, in which the collar or flange $e$ is located, thus entirely shutting off the shaft from the receiving pan or case, and preventing the crushed material from clogging or stopping the shaft.

H represents a curved bracket which is bolted to the under side of the beam A, which bracket is provided with a secured plate, H', having an opening, $i$, and an upwardly-extending annular flange, $j$, surrounding said opening, but located some distance therefrom.

I represents a step or bearing-box for the shaft D', which consists of an outer shell, J, somewhat smaller than the opening $i$, and having a circumferential shoulder, which rests on the plate H' and supports the shell J. The lower end of the shell J is open, and located in said shell is a circular piece, K, in which the lower end of the shaft works, said circular piece being provided with suitable anti-friction plates or rings, L.

M represents a lever, which is pivoted at one end to an eyebolt, N, suspended from the curved bracket H, and vertically adjustable at its other end by means of a threaded bolt working loosely at its upper end in a box, O, secured to the beam A, and passing through a threaded opening in the end of the lever, said bolt being provided with a hand-wheel, whereby the lever may be readily and quickly vertically adjusted. The lever M is provided with an opening, $n$, and in said opening is pivoted an arm or stud, N', which bears against the lower end of the circular piece K and supports the circular piece K and the shaft D'. By moving the hand-wheel the shaft may be vertically adjusted to cause the material to be ground fine or coarse, as may be desired, and as will be readily seen.

With the construction before described any well-known arrangement of belts or gearing located above the mill may be employed to rotate the shaft D'.

Having thus described my invention, I claim—

A crushing and grinding mill comprising a shell, a shaft passing therethrough, a cone mounted on said shaft within the shell, a curved bracket, H, provided with plate H', having an upwardly-extending flange, $j$, and an opening, $i$, a bearing-box having an annular flange, a circular piece located in said box, bolts working in flange $j$ and abutting against the bearing-box, a lever pivoted at one end and adjustable at its other end, and a stud pivoted in an opening of the lever and bearing against the circular piece K, substantially as set forth.

In testimony whereof I affix my signature in presence of two witnesses.

JABEZ GILES KIRKER.

Witnesses:
LEANDER K. GRAINGER,
JAMES M. KIRKER.